US012122663B2

(12) United States Patent
Tan et al.

(10) Patent No.: US 12,122,663 B2

(45) Date of Patent: Oct. 22, 2024

(54) POCKET SPRING BED MESH BONDING COMBINING APPARATUS AND METHOD, AND POCKET SPRING MATTRESS

(71) Applicant: GUANGZHOU LIANROU MACHINERY & EQUIPMENT CO., LTD., Guangzhou (CN)

(72) Inventors: Zhiming Tan, Guangzhou (CN); Jie Liang, Guangzhou (CN); Zhiliang Tan, Guangzhou (CN)

(73) Assignee: GUANGZHOU LIANROU MACHINERY & EQUIPMENT CO., LTD., Guangzhou (CN)

( * ) Notice: Subject to any disclaimer, the term of this patent is extended or adjusted under 35 U.S.C. 154(b) by 566 days.

(21) Appl. No.: 17/433,336

(22) PCT Filed: May 24, 2019

(86) PCT No.: PCT/CN2019/088293

§ 371 (c)(1),
(2) Date: Aug. 24, 2021

(87) PCT Pub. No.: WO2020/206820

PCT Pub. Date: Oct. 15, 2020

(65) Prior Publication Data

US 2022/0144622 A1 May 12, 2022

(30) Foreign Application Priority Data

Apr. 11, 2019 (CN) ........................ 201910288112.4

(51) Int. Cl.
*B68G 7/12* (2006.01)
*A47C 27/06* (2006.01)

(52) U.S. Cl.
CPC ............. *B68G 7/12* (2013.01); *A47C 27/064* (2013.01)

(58) Field of Classification Search
CPC ..... A47C 27/06; A47C 27/061; A47C 27/062; A47C 27/063; A47C 27/064;
(Continued)

(56) References Cited

U.S. PATENT DOCUMENTS

| | | | | |
|---|---|---|---|---|
| 6,295,676 B1 * | 10/2001 | Warner | ................ | A47C 27/064 5/717 |
| 7,211,167 B1 * | 5/2007 | Whitworth | ............... | B68G 9/00 118/255 |
| 2011/0154653 A1 * | 6/2011 | Kujuro | ..................... | B68G 9/00 29/795 |

FOREIGN PATENT DOCUMENTS

| | | |
|---|---|---|
| CN | 1344223 A | 4/2002 |
| CN | 201334356 Y | 10/2009 |

(Continued)

OTHER PUBLICATIONS

International Search Report issued on Jan. 16, 2020 in corresponding International application No. PCT/CN2019/088293; 4 pages.

(Continued)

*Primary Examiner* — George R Koch
(74) *Attorney, Agent, or Firm* — Maier & Maier, PLLC

(57) ABSTRACT

An apparatus for bonding and combining a pocket spring bed mesh and method, and a pocket spring bed mesh. The apparatus includes a rack, a platform arranged on the rack for driving the pocket spring bed mesh to move reciprocally, a rotating mechanism used for driving the pocket spring bed mesh to rotate, and a combining mechanism used for combining pocket spring strings to form the pocket spring bed mesh. The combining mechanism bonds and combines pocket spring strings to form an unshaped pocket spring bed mesh which is driven by the platform to move to the position of rotating mechanism to be rotated for adjusting the orientation, then the pocket spring bed mesh is moved by the platform to the combining mechanism, and the combining (Continued)

mechanism bonds and combines the side parts of the unshaped pocket spring bed mesh using a pocket spring string of a smaller diameter.

17 Claims, 9 Drawing Sheets

(58) Field of Classification Search
CPC ... A47C 27/065; A47C 27/066; A47C 27/067; A47C 27/068; A47C 27/07; B68G 7/12; B68G 9/00
See application file for complete search history.

(56) References Cited

FOREIGN PATENT DOCUMENTS

| | | | | | |
|---|---|---|---|---|---|
| CN | 102070117 | A | | 5/2011 | |
| CN | 202063707 | U | | 12/2011 | |
| CN | 105292582 | A | | 2/2016 | |
| CN | 105947968 | A | | 9/2016 | |
| CN | 206197553 | U | | 5/2017 | |
| CN | 109152488 | A | | 1/2019 | |
| DE | 297 22 598 | U1 | | 2/1998 | |
| EP | 0 682 135 | A1 | | 11/1995 | |
| EP | 682135 | B1 | * | 4/1998 | ........... D05B 11/005 |
| IN | 206079826 | U | | 4/2017 | |
| WO | 2018/226183 | A2 | | 12/2018 | |

OTHER PUBLICATIONS

First Office Action issued on Jan. 15, 2020 in corresponding Chinese application No. 201910288112.4; 23 pages.
First Search Report issued on Jan. 7, 2020 in corresponding Chinese application No. 201910288112.4; 2 pages.
Supplementary Search Report issued on Apr. 22, 2020 in corresponding Chinese application No. 201910288112.4; 1 page.

* cited by examiner

POCKET SPRING BED MESH BONDING COMBINING APPARATUS AND METHOD, AND POCKET SPRING MATTRESS

TECHNICAL FIELD

The invention relates to the technical field of mechanical equipment for mattresses, and particularly relates to an apparatus for bonding and combining a pocket spring bed mesh and method thereof, and a pocket spring bed mesh.

BACKGROUND

Pocket spring bed meshes are formed by arranging and bonding pocket spring strings. Patent CN 103502137 B discloses a device and method for conveying spring strings, wherein pocket spring strings are conveyed in order to a preset position from a corresponding position and then bonded and combined to form a pocket spring bed mesh. Because the diameter of springs is constant, the finished pocket spring bed mesh has single hardness.

Pocket spring strings with different degrees of hardness can be combined to form a pocket spring bed mesh with different degrees of hardness in different areas. However, in the prior art, the pocket spring strings with different degrees of hardness are generally manufactured by manual welding and are then bonded with glue to form the pocket spring bed mesh, which is time-consuming and labor-consuming, low in production efficiency and poor in quality stability. In the prior art, the pocket spring bed mesh with different degrees of hardness in different areas can also be manufactured by bonding pocket spring strings with different degrees of hardness produced by special double-steel wire pocket spring machines, which needs to change a great deal of existing pocket spring machines, so the equipment purchasing cost is high; in addition, springs in the same pocket spring string produced by the double-steel wire pocket spring machine have different degrees of hardness due to different diameters of steel wires thereof, but the diameters of the springs in the same pocket spring string are identical, so it is impossible to manufacture a pocket spring bed mesh with different degrees of hardness by means of springs with different diameters.

SUMMARY

The objective of the invention is to solve at least one technical problem of the prior art by providing a pocket spring bed mesh bonding and combining apparatus and method, which can effectively improve the production efficiency and can form a pocket spring bed mesh with stable and reliable quality by means of springs with different diameters.

In a first aspect, the invention provides an apparatus for bonding and combining a pocket spring bed mesh, comprising a rack, a platform arranged on the rack and used for driving a pocket spring bed mesh to move reciprocally, a rotating mechanism arranged on the rack, located above the platform and used for driving the pocket spring bed mesh to rotate, and a combining mechanism arranged on the rack, located on one side of the platform and used for combining pocket spring strings to form the pocket spring bed mesh.

The apparatus for bonding and combining a pocket spring bed mesh has at least the following beneficial effects: the combining mechanism bonds and combines pocket spring strings together to form an unshaped pocket spring bed mesh, which is then driven by the platform to move to the rotating mechanism for rotating the pocket spring bed mesh to adjust the orientation, then the pocket spring bed mesh is moved by the platform to the combining mechanism, the combining mechanism bonds and combines the side parts of the unshaped pocket spring bed mesh using pocket spring strings with a smaller diameter, and after bonding of one side of the pocket spring bed mesh is finished, the pocket spring bed mesh is rotated to carry out bonding of the other side of the pocket spring bed mesh; the process is repeated to implement automated production and processing of the pocket spring bed mesh, and the production and processing efficiency is effectively improved.

According to the apparatus for bonding and combining a pocket spring bed mesh in the first aspect of the invention, the rotating mechanism comprises a rotating frame and clamping plates arranged on two sides of the rotating frame respectively, and the clamping plates on the two sides are able to move close to or away from each other to clamp or release the pocket spring bed mesh.

According to the apparatus for bonding and combining a pocket spring bed mesh in the first aspect of the invention, the rotating frame is able to move upwards and downwards; or, a driving mechanism for driving the clamping plates to move upwards and downwards and/or to turn is arranged on the rotating frame.

According to the apparatus for bonding and combining a pocket spring bed mesh in the first aspect of the invention, the combining mechanism comprises a pressing component arranged above the platform and able to move upwards and downwards, a preset gap being formed between the pressing component and the platform; a delivery component arranged outside the platform and used for delivering the pocket spring strings; a transferring component outside the platform and used for transferring the pocket spring strings in the delivery component into the preset gap; and a glue spraying component used for spraying glue onto a side surface of the pocket spring bed mesh and/or each pocket spring string.

According to the apparatus for bonding and combining a pocket spring bed mesh in the first aspect of the invention, the pressing component comprises a beam and a pressing plate and/or a conveying belt arranged below the beam and capable of moving upwards and downwards with respect to the beam.

According to the apparatus for bonding and combining a pocket spring bed mesh in the first aspect of the invention, a through hole penetrates through the pressing plate and/or the conveying belt.

According to the apparatus for bonding and combining a pocket spring bed mesh in the first aspect of the invention, an air supply component is arranged on the pressing plate and/or the conveying belt.

According to the apparatus for bonding and combining a pocket spring bed mesh in the first aspect of the invention, lifting mechanisms respectively connected to two ends of the beam are arranged on the rack.

According to the apparatus for bonding and combining a pocket spring bed mesh in the first aspect of the invention, the pressing component comprises a pressing plate and/or a conveying belt, and an air supply component is arranged on the pressing plate and/or the conveying belt.

According to the apparatus for bonding and combining a pocket spring bed mesh in the first aspect of the invention, the delivery component comprises a first conveying belt and a second conveying belt vertically spaced apart from each other.

According to the apparatus for bonding and combining a pocket spring bed mesh in the first aspect of the invention, the transferring component comprises a push rod capable of moving reciprocally to penetrate through the delivery component.

According to the apparatus for bonding and combining a pocket spring bed mesh in the first aspect of the invention, the glue spraying component is arranged between the delivery component and the platform and is able to move along the direction of conveying the pocket spring string by the delivery component; or, the glue spraying component is fixedly arranged between the delivery component and the platform and faces the delivery component.

According to the apparatus for bonding and combining a pocket spring bed mesh in the first aspect of the invention, the pocket spring bed mesh bonding and combining apparatus further comprises a switching mechanism arranged at upstream position of the delivery component, wherein the switching mechanism comprises at least two conveying passages for accommodating pocket spring strings of different specifications, a conveying component for conveying the pocket spring strings in the conveying passages into the transferring component, and a cutting component for cutting the pocket spring strings to a preset length.

According to the apparatus for bonding and combining a pocket spring bed mesh in the first aspect of the invention, positioning plates are arranged on two sides of the platform respectively, and the positioning plates on the two sides are located between the rotating mechanism and the combining mechanism and are able to move close to or away from each other to clamp or release the pocket spring bed mesh.

According to the apparatus for bonding and combining a pocket spring bed mesh in the first aspect of the invention, the pocket spring bed mesh bonding and combining apparatus further comprises a sensor component for detecting the length and/or width of the pocket spring bed mesh and/or the position of the pocket spring bed mesh.

According to the apparatus for bonding and combining a pocket spring bed mesh in the first aspect of the invention, the platform comprises multiple rollers arranged in sequence; or, the platform comprises at least one section of conveying belt, and the adjacent conveying belts are arranged in sequence.

In a second aspect, the invention provides a method for bonding and combining a pocket spring bed mesh, comprising the following steps:

S1: forming a middle part of a pocket spring bed mesh by bonding and combination;

S2: rotating the pocket spring bed mesh by a preset angle;

S3: bonding and combining outer parts of the pocket spring bed mesh; and

S4: repeating Step S2 and Step S3 at least once.

The method for bonding and combining a pocket spring bed mesh has at least the following beneficial effects: first of all, pocket spring strings with a large diameter are bonded and combined to form a middle part of a pocket spring bed mesh, wherein the middle part is an unshaped pocket spring bed mesh; then, the pocket spring bed mesh is rotated for adjusting the orientation; then, pocket spring strings with a small diameter are bonded and combined to form side parts of the pocket spring bed mesh; after bonding of one side of the pocket spring bed mesh is finished, the pocket spring bed mesh is rotated to carry out bonding of the other side of the pocket spring bed mesh; this process is repeated to realize automated production and processing of the pocket spring bed mesh, and the production and processing efficiency is effectively improved.

According to the method for bonding and combining a pocket spring bed mesh in the second aspect of the invention, the preset angle is 90° or 180°.

The method for bonding and combining a pocket spring bed mesh in the second aspect of the invention is implemented by the apparatus for bonding and combining a pocket spring bed mesh in the first aspect, and comprises the following steps:

S1: forming a middle part of a pocket spring bed mesh by bonding and combination by using the combining mechanism;

S2: moving the pocket spring bed mesh to the rotating mechanism by the platform, rotating the pocket spring bed mesh by a preset angle by the rotating mechanism, and then moving the pocket spring bed mesh to the combining mechanism by the platform;

S3: bonding and combining outer parts of the pocket spring bed mesh through the combining mechanism; and S4: repeating Step S2 and Step S3 at least once.

In a third aspect, the invention provides a pocket spring bed mesh which is formed by the apparatus for bonding and combining a pocket spring bed mesh in the first aspect.

A fourth aspect, the invention provides a pocket spring bed mesh which is formed by the method for bonding and combining a pocket spring bed mesh in the second aspect.

BRIEF DESCRIPTION OF THE DRAWINGS

The invention will be further explained below in conjunction with accompanying drawings and embodiments.

DETAILED DESCRIPTION OF EMBODIMENTS

Figure 1:
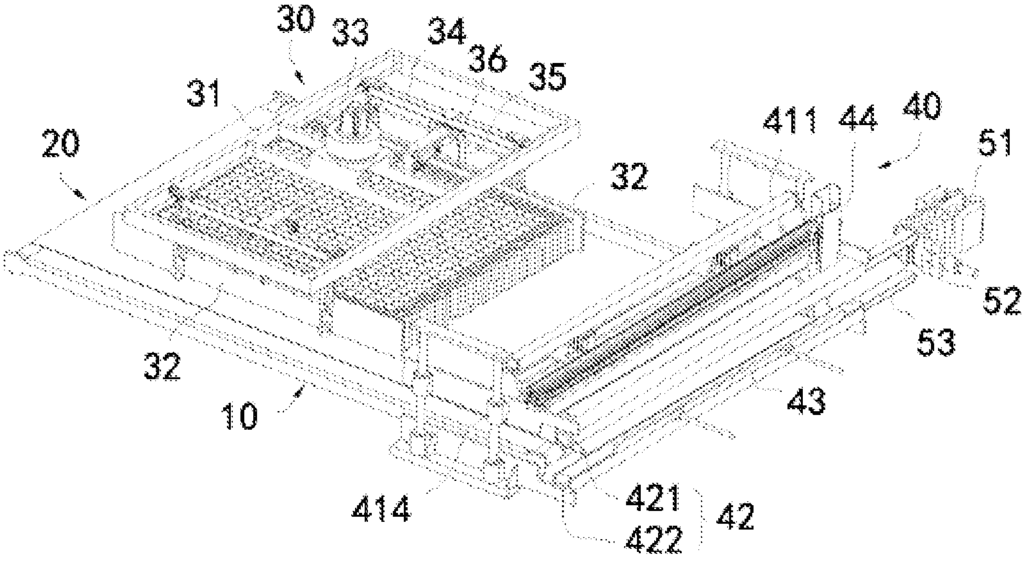
FIG. 1 is a structural diagram of one embodiment of an apparatus for bonding and combining a pocket spring bed mesh according to the invention.

Specific embodiments of the invention will be described in detail in this part. Preferred embodiments of the invention are illustrated in the drawings, which are used for providing a supplemental explanation of those described by characters by means of figures, such that those skilled in the art can intuitively and vividly understand each technical feature and the overall technical solution of the invention. Obviously, the drawings should not be construed as limitations of the protection scope of the invention.

It should be understood that directional terms in the description of the invention, such as "upper", "lower", "front", "back", "left" and "right", are used to indicate directional or positional relations based on the directional or positional relations shown in the figures only for the purpose of facilitating and simplifying the description of the invention, do not indicate or imply that a device or element referred to must have a specific direction or be configured and operated in a specific direction, and thus should not be construed as limitations of the invention.

In the description of the invention, "a plurality of" refers to one or more, "multiple" refers to two or more, "greater than", "less than" and "exceed" should be interpreted as not including the number referred to, and "over", "below" and "within" should be interpreted as including the number referred to. "First" and "second", if any, are merely for the purpose of distinguishing one technical feature from the other, and do not indicate or imply relative importance or implicitly specify the number or precedence relationship of the technical features referred to.

Unless otherwise clearly specified, terms such as "arrange", "mount" and "connect" in the description of the invention should be broadly understood, and those skilled in the art can reasonably determine the specific meaning of these terms in the invention in combination with the specific contents of the technical solution of the invention.

Generally, under the condition that the dimension parameter such as the diameter of steel wires of springs is not changed, the smaller the diameter of springs, the higher the hardness; on the contrary, the larger the diameter of the springs, the softer the springs. By means of this characteristic of the springs, springs with a smaller diameter are used to form edge parts of a pocket spring bed mesh, such that the edge parts of the pocket spring bed mesh have high hardness and are not prone to collapsing or deformation. At present, pocket spring bed mesh production equipment in the prior art can only produce pocket spring bed meshes with single hardness, and the pocket spring bed meshes with higher hardness on edge parts cannot be produced at a time by the existing equipment in flow process.

The invention provides an apparatus for bonding and combining a pocket spring bed mesh that can implement flow and automated production of such pocket spring bed meshes without manual bonding, thus effectively improving the production efficiency.

Figure 2:
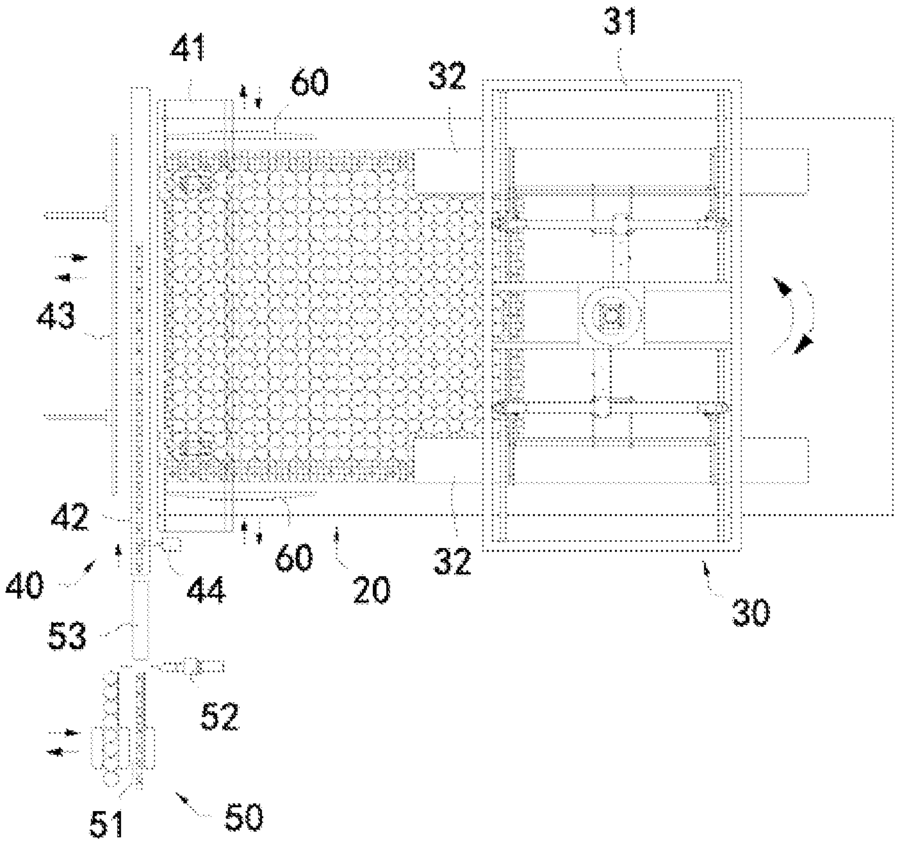
FIG. 2 is a top view of one embodiment of the apparatus for bonding and combining a pocket spring bed mesh according to the invention.

As shown in FIG. 1 and FIG. 2, the embodiments of the invention provide an apparatus for bonding and combining a pocket spring bed mesh, comprising a rack 10, a platform 20, a rotating mechanism 30 and a combining mechanism 40.

Wherein, the platform 20 is arranged on the rack 10 and is able to move reciprocally in a preset direction. In this embodiment, the platform 20 moves forwards and backwards. When a pocket spring bed mesh is placed on the platform 20, the pocket spring bed mesh can move forwards and backwards along with the platform 20. The rotating mechanism 30 is arranged on the rack 10 and is located behind the platform 20. The combining mechanism 40 is arranged on the rack 10 and is located in front of the platform 20. The platform 20 drives the pocket spring bed mesh to move forwards or backwards to the rotating mechanism 30 or the combining mechanism 40.

The platform 20 used for driving the pocket spring bed mesh to move may be of different structures. In this embodiment, the platform 20 is composed of a complete conveying belt for implementing cyclic conveying and a power mechanism for driving the conveying belt to operate. The conveying belt is preferably a belt, and a top surface of the conveying belt is used for carrying the pocket spring bed mesh. When the conveying belt moves forwards or backwards, the pocket spring bed mesh is driven to move forwards or backward. In some other embodiments, the platform 20 may be composed of multiple sections of conveying belts connected end-to-end in the front-back direction, wherein each section of conveying belt has a small length, and all sections of the conveying belts are arranged in sequence; and similarly, top surfaces of all sections of the conveying belts form a plane for carrying the pocket spring bed mesh, and all sections of the conveying belts operate synchronously to drive the pocket spring bed mesh to move forwards or backwards.

In some other embodiments, the platform 20 may be composed of multiple rollers connected end-to-end in the front-back direction, wherein all the rollers are arranged in sequence, and top surfaces of the rollers are used for supporting the pocket spring bed mesh; and when the rollers are synchronously driven to rotate forwards or backwards, the pocket spring bed mesh is driven to move forwards or backwards.

The rotating mechanism 30 is arranged above the platform 20 and can operate to drive the pocket spring bed mesh on the platform 20 to rotate to adjust the orientation of the pocket spring bed mesh. Specifically, the rotating mechanism 30 comprises a rotating frame 31 arranged on the rack 10 and clamping plates 32 arranged on left and right sides of the rotating frame 31 respectively, wherein the rotating frame 31 can be driven to rotate, and the rotation angle of the rotating frame 31 can be set by users and is generally 90° or 190°. The clamping plates 32 on the left and right sides can move close to or away from each other. When moving towards the middle to be close to each other, the clamping plates 32 on the two sides contact with each other and clamp the pocket spring bed mesh, and at this moment, the rotating frame 31 rotates to drive the pocket spring bed mesh to rotate synchronously. It can be understood that when moving oppositely to be away from each other, the clamping plates 32 on the two sides are separated from each other and release the pocket spring bed mesh.

Of course, when the clamping plates 32 on the two sides move close to or away from each other, it is not necessary for the clamping plates 32 to move synchronously. It is also possible that the clamping plate 32 on one side is fixed and the clamping plate 32 on the other side moves to clamp or release the pocket spring bed mesh.

Wherein, the clamping plates 32 on the left and right sides can turn upwards, so that the pocket spring bed mesh can move forwards or backward without being disturbed by the clamping plates 32, that is, the pocket spring bed mesh will not be hindered by the clamping plates 32 when moving forwards or backwards.

In this embodiment, a guide rail 33 is arranged on the rotating frame 31, a slide 34 is able to move along the guide rail 33, a swing connecting rod 35 is hinged and connected to the bottom of the slide 34, the clamping plates 32 are connected to the swing connecting rod 35, and the swing connecting rod 35 can be driven by a cylinder 36 to swing to drive the clamping plates 32 to turn. In some embodiments, the clamping plates 32 may be able to move upwards and downwards, and in this case, the pocket spring bed mesh can also move forwards or backwards without being hindered by the clamping plates 32. The specific structure of the clamping plates 32 can be selected by those skilled in the art as actually needed, and will not be detailed anymore.

In some other embodiments, the entire rotating frame 31 can move upwards or downwards to drive the clamping plates 32 to move upwards or downwards, such that the pocket spring bed mesh will not be disturbed by the clamping plates 32 when moving back and forth.

The combining mechanism 40 is used for bonding and combining pocket spring strings to form the pocket spring bed mesh. Generally, a pocket spring string of a preset length is conveyed to preset position, then glue is sprayed onto a side surface of the pocket spring string, after that, the pocket spring string is pushed or pulled to the position of an unshaped pocket spring bed mesh, and the unshaped pocket spring bed mesh and the pocket spring string are bonded and combined together with glue; this process is repeated until a complete pocket spring bed mesh is formed.

In this embodiment, the combining mechanism 40 comprises a pressing component 41, a delivery component 42, a transferring component 43 and a glue spraying component 44.

The pressing component 41 is arranged above the platform 20 and located in front of the platform 20 and can move upwards and downwards, such that a preset gap between the pressing component 41 and the platform 20 can be changed and adjusted, which is beneficial to bonding and combination of the pocket spring bed mesh. In this embodiment, the pressing component 41 comprises a beam 411 and a pressing plate 412 arranged below the beam 411, the beam 411 and the pressing plate 412 are connected through a cylinder 413, the cylinder 413 operates to drive the pressing plate 412 to move upwards or downwards, a preset gap is formed between the pressing plate 412 and the platform 20, and the unshaped pocket spring bed and the pocket spring string are bonded and combined in the preset gap. When the pressing plate 412 moves downwards to a lowest position, the preset gap is smaller than the height of the pocket spring bed mesh, so that the pocket spring bed mesh can be compressed to some extent to be temporarily fixed, the pocket spring string pushed into the preset gap can be smoothly and stably bonded on a side surface of the unshaped pocket spring bed mesh. When the pressing plate 412 moves upwards to a highest position, the preset gap is greater than the height of the pocket spring bed mesh, and at this moment, the pocket spring bed mesh can be driven by the platform 20 to move forwards or backward without being disturbed.

In addition, left and right ends of the beam 411 are connected to the rack 10 through lifting mechanism 414, and the lifting mechanisms 414 are rail mechanisms. The height of the beam 411 can be adjusted through the lifting mechanisms 414, and then the height of the pressing plate 412 can be adjusted, such that pocket spring bed meshes of different heights can be manufactured and processed.

Figure 3:
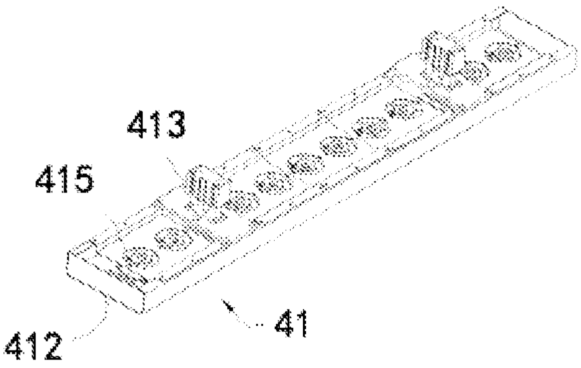
FIG. 3 is a structural diagram of a pressing plate in one embodiment of the apparatus for bonding and combining a pocket spring bed mesh according to the invention.
Figure 4:
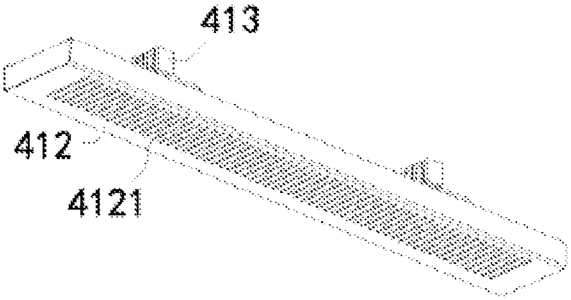
FIG. 4 is a structural diagram from another perspective of the pressing plate in one embodiment of the apparatus for bonding and combining a pocket spring bed mesh according to the invention.
Figure 5:
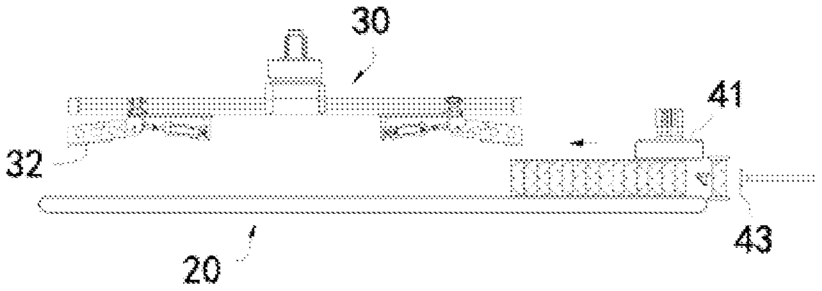
FIG. 5 is a schematic diagram of one embodiment of the apparatus for bonding and combining a pocket spring bed mesh in a first action state according to the invention.
Figure 6:
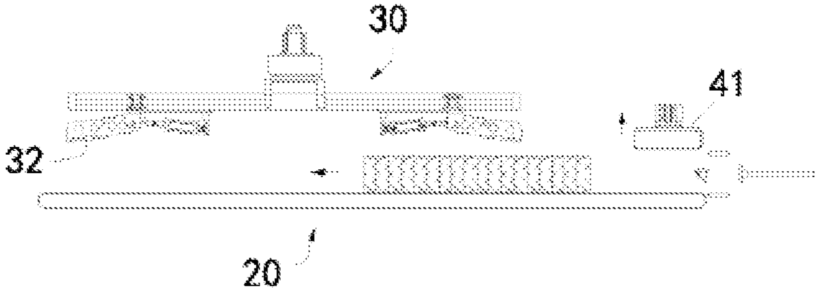
FIG. 6 is a schematic diagram of one embodiment of the apparatus for bonding and combining a pocket spring bed mesh in a second action state according to the invention.
Figure 7:
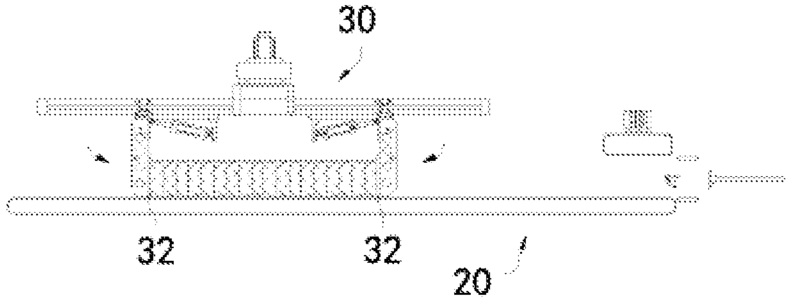
FIG. 7 is a schematic diagram of one embodiment of the apparatus for bonding and combining a pocket spring bed mesh in a third action state according to the invention.
Figure 8:
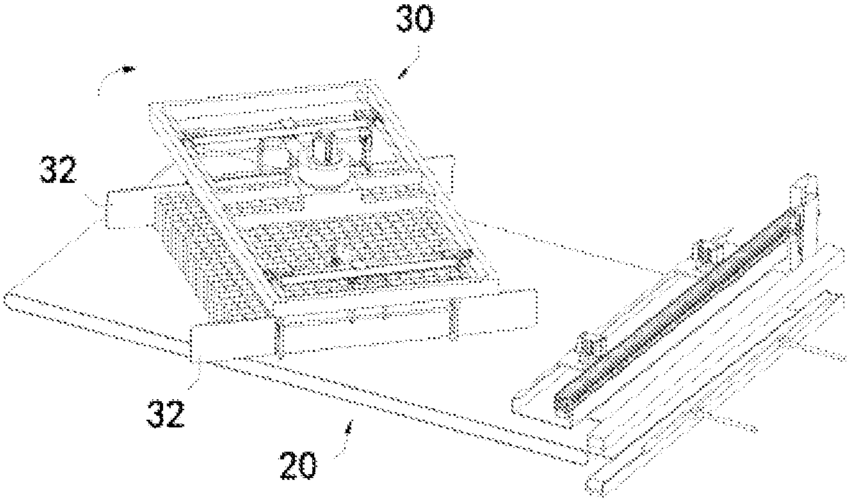
FIG. 8 is a schematic diagram of one embodiment of the apparatus for bonding and combining a pocket spring bed mesh in a fourth action state according to the invention.
Figure 9:
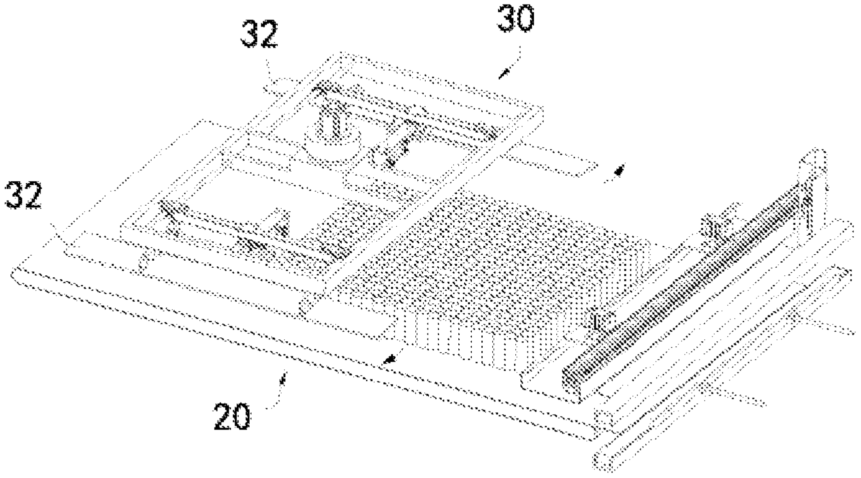
FIG. 9 is a schematic diagram of one embodiment of the apparatus for bonding and combining a pocket spring bed mesh in a fifth action state according to the invention.
Figure 10:
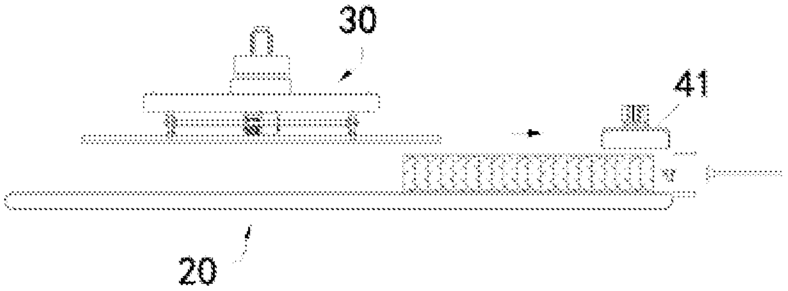
FIG. 10 is a schematic diagram of one embodiment of the apparatus for bonding and combining a pocket spring bed mesh in a sixth action state according to the invention.
Figure 11:
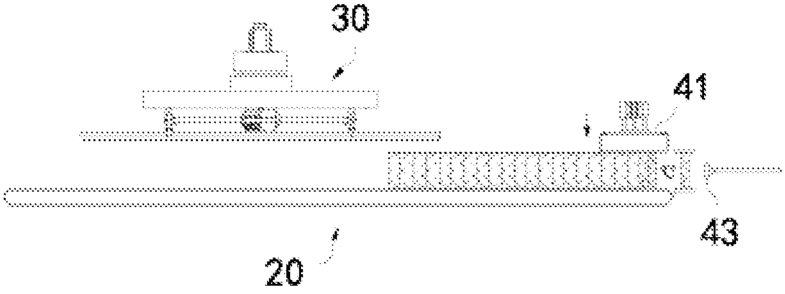
FIG. 11 is a schematic diagram of one embodiment of the apparatus for bonding and combining a pocket spring bed mesh in a seventh action state according to the invention.

Referring to FIG. 3 and FIG. 4, the pressing plate 412 may be a flat plate structure, through holes 4121 penetrate through the flat plate 412 and may be of any shape, and the through holes 4121 are preferably strip-shaped through holes arranged and distributed at intervals to form a ventilation gap. Multiple air supply fans 415 are arranged on the pressing plate 412, and an air flow generated by the air supply fans 415 is blown into the pocket spring bed mesh via the through holes 4121, such that glue can be cured more rapidly in the bonding and combining process of the pocket spring bed mesh. It can be understood that a component such as an air supply pipe may be arranged on the pressing plate 412, and the air flow is guided into the through holes 4121 through the air supply pipe, such that glue can be cured rapidly.

In some embodiments, the pressing plate 412 may be replaced with a conveying belt in a horizontal state, and the conveying belt moves downwards to compress and fix the pocket spring bed mesh to some extent. It should be understood that the pressing plate 412 may be replaced with a combined structure of a flat plate and a conveying belt that are adjacent to and in staggered connection to each other.

The delivery component 42 is arranged outside the platform 20, is located in front of the platform 20, and is used for delivering the pocket spring string into the preset gap for bonding and combination. In this embodiment, the delivery component 42 comprises a first conveying belt 421 and a second conveying belt 422 which are vertically spaced apart from each other, the first conveying belt 421 and the second conveying belt 422 are belts, and the distance between the first conveying belt 421 and the second conveying belt 422 is smaller than the height of the pocket spring string. The pocket spring string is compressed to some extent between the first conveying belt 421 and the second conveying belt 422, and the first conveying belt 421 and the second conveying belt 422 can operate synchronously to clamp the pocket spring string to move and convey the pocket spring string.

The transferring component 43 is used transferring the pocket spring string into the preset gap for bonding and combination of the pocket spring bed mesh. In this embodiment, the transferring component 43 is a push rod arranged outside the platform 20, and the transferring component 43 can move forwards or backward to penetrate through the gap between the first conveying belt 421 and the second conveying belt 422 to push the pocket spring string between the first conveying belt 421 and the second conveying belt 422 into the preset gap to be bonded and combined with the unshaped pocket spring bed mesh.

The glue spraying component 44 is used for spraying glue for bonding and combination of the pocket spring bed mesh. The specific installation position of the glue spraying component 44 can be flexibly selected by those skilled in the art as long as glue can be sprayed onto the side surface of the pocket spring bed mesh and/or the pocket spring string before the pocket spring string is pushed into the preset gap. In this embodiment, the glue spraying component 44 is arranged between the pressing component 41 and the delivery component 42 and can move reciprocally in the length direction of the first conveying belt 421 and the second conveying belt 422. When the pocket spring string is clamped by the first conveying belt 421 and the second conveying belt 422, the glue spraying component 44 moves reciprocally to spray glue onto the side surface of the pocket spring string. When pushed into the preset gap and contacting with the unshaped pocket spring bed mesh, the pocket spring string is bonded and combined with the unshaped pocket spring bed mesh.

In some embodiments, the glue spraying component 44 may be fixedly arranged at an upstream area of the first conveying belt 421 and the second conveying belt 422 and located between the pressing component 41 and the delivery component 42. A glue outlet of the glue spraying component 44 faces the delivery component 42. When the pocket spring string is clamped to be moved and conveyed through the glue spraying component 44, glue is continuously sprayed onto the side surface of the pocket spring string.

To provide pocket spring strings with different diameters easily and rapidly, a switching mechanism 50 is arranged at an upstream position of the delivery component 42 to convey pocket spring strings with different parameters into the delivery component 42 according to actual requirements of a manufactured pocket spring bed mesh. Specifically, the switching mechanism 50 comprises conveying passages 51, a conveying component (not shown) and a cutting component 52.

The switching mechanism 50 comprises multiple conveying passages 51, and each conveying passage 51 accommodates pocket spring strings of one specification. The conveying passages 51 can move forwards or backwards to be adjusted. When one corresponding conveying passage 51 faces the conveying component 42, a pocket spring string of a selected specification can be conveyed into the delivery component 42, and the pocket spring string is pulled or driven out of the conveying passage 51 by the conveying component. A pair of transitional belt 53 are arranged between the conveying passages 51 and the delivery component 42 and are connected with the first conveying belt 421 and the second conveying belt 422. The cutting component 52 is an ultrasonic cutter and is used for cutting the pocket spring string to a preset length. Wherein, other optional embodiments for providing pocket spring strings of different specifications by the switching mechanism may be implemented with reference to Patent Document CN105947968A.

In this embodiment, positioning plates 60 are arranged on two sides of the platform 20 respectively and are located between the platform 20 and the pressing component 41 in the height direction. The positioning plates 60 on the two sides are located between the rotating mechanism 30 and the combining mechanism 40 and can move close to or away from each other to clamp or release the pocket spring bed mesh. The positioning plates 60 are used for positioning the pocket spring bed mesh in the middle of the platform 20. The pocket spring bed mesh located in the middle of the platform 20 can be accurately bonded and combined and is prevented against deviation and dislocation.

A sensor component is further arranged on the rack 10, is located between the platform 20 and the pressing component 41 and is close to the combining mechanism 40. The sensor component is an electronic distance sensor. The specific installation position of the sensor component can be flexibly selected by those skilled in the art. When the pocket spring bed mesh is moved and conveyed to the combining mechanism 40, the sensor component is used to detect the dimension parameter and position of one side of the pocket spring bed mesh, and then a preset length and conveying position of the pocket spring string are determined according to the dimension parameter of the pocket spring bed mesh to realize accurate bonding and combination.

Referring to FIG. 5 to FIG. 11, the specific process of bonding and combining pocket spring strings to form a pocket spring bed mesh by the pocket spring bed mesh bonding and combining apparatus provided by the embodiments of the invention is as follows: pocket spring strings with a larger diameter are bonded and combined by the combining mechanism 40 to form a middle part of the pocket spring bed mesh, namely an unshaped pocket spring bed mesh; the platform 20 moves backwards to drive the unshaped pocket spring bed mesh to move backwards to the rotating mechanism 30; the rotating mechanism 30 works to rotate the unshaped pocket spring bed mesh on the platform 20 by 90°; then, the platform 20 moves forwards to drive the unshaped pocket spring bed mesh to move to the combining mechanism 40; side parts of the unshaped pocket spring bed mesh are bonded and combined using pocket spring strings with a smaller diameter by the combining mechanism 40, such that the hardness of the side parts is high; this process is repeated to form a complete pocket spring bed mesh finally.

The embodiments of the invention further provide a method for bonding and combining a pocket spring bed mesh, comprising the following steps:

S1: A middle part of a pocket spring bed mesh is formed by bonding and combination, wherein the middle part of the pocket spring bed mesh is an unshaped pocket spring bed mesh;

S2: the pocket spring bed mesh is rotated by a preset angle, generally 90° or 180°;

S3: outer parts of the pocket spring bed mesh are bonded and combined, wherein the outer parts of the pocket spring bed mesh are edge parts and are bonded and combined using pocket spring strings with a smaller diameter, so that the hardness of the edge parts is high; and S4: Step S2 and Step S3 are repeated to bond and combine adjacent sides or opposite sides of the pocket spring bed mesh according to the design requirement and bonding and combining sequence of the pocket spring bed mesh, so that a complete pocket spring bed mesh is formed.

Figure 12:
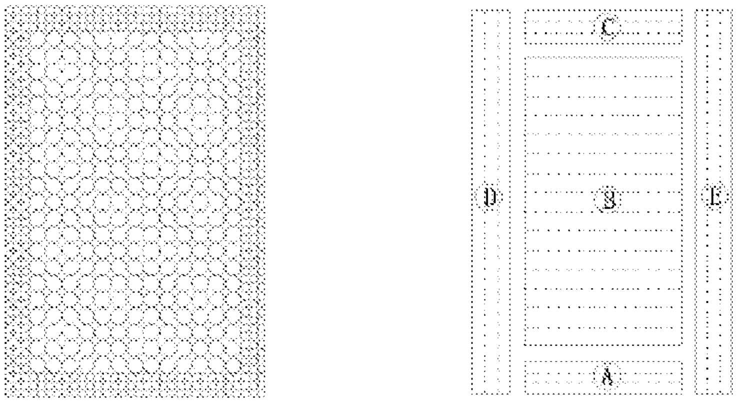
FIG. 12 is a schematic diagram of a first embodiment of a method for bonding and combining a pocket spring bed mesh according to the invention.

Referring to FIG. 12, in some embodiments, the method for bonding and combining a pocket spring bed mesh comprises the following steps:

S1: pocket spring strings are sequentially bonded and combined to form a middle part of a pocket spring bed mesh, wherein the middle part is divided into a part A, a part B and a part C, the part A and the part C are formed by bonding and combining pocket spring strings with a smaller diameter and are used as edge parts of the pocket spring bed mesh, and the part B is formed by bonding and combining pocket spring strings with a larger diameter and is used as a center part of the pocket spring bed mesh;

S2: the pocket spring bed mesh is rotated by 90°;

S3: a part D is bonded and combined, which is formed by bonding and combining pocket spring strings with a smaller diameter;

S4: then the pocket spring bed mesh is rotated by 180°; and

S5: a part E is bonded and combined, which is formed by bonding and combining pocket spring strings with a smaller diameter, so that a complete pocket spring bed mesh is formed.

Figure 13:
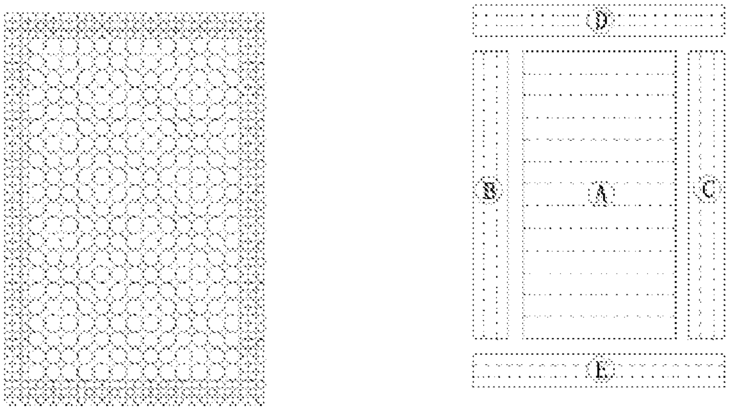
FIG. 13 is a schematic diagram of a second embodiment of the method for bonding and combining a pocket spring bed mesh according to the invention.

Referring to FIG. 13, in some embodiments, the method for bonding and combining a pocket spring bed mesh comprises the following steps:

S1: a middle part of a pocket spring bed mesh is formed by bonding and combination, wherein the middle part is used as a center part of the pocket spring bed mesh, and a part A is formed by bonding and combining pocket spring strings with a larger diameter;

S2: then the pocket spring bed mesh is rotated by 90°;

S3: a part B is bonded and combined, which is formed by bonding and combining pocket spring strings with a smaller diameter;

S4: then the pocket spring bed mesh is rotated by 180°;

S5: a part C is bonded and combined, which is formed by combining pocket spring strings with a smaller diameter;

S6: then the pocket spring bed mesh is rotated by 90°;

S7: a part D is bonded and combined, which is formed by bonding and combining pocket spring strings with a smaller diameter;

S8: then the pocket spring bed mesh is rotated by 180°; and

S9: a part E is bonded and combined, which is formed by bonding and combining pocket spring strings with a smaller diameter, so that a complete pocket spring bed mesh is formed.

According to the apparatus for bonding and combining a pocket spring bed mesh bonding and method thereof provided by the embodiments of the invention, a pocket spring bed mesh with different degrees of hardness in different areas can be formed by bonding and combining pocket spring strings with different diameters under the condition that the diameter of steel wires of the springs is not changed; and existing pocket spring machines do not need to be abandoned or replaced, such that the manufacturing cost is effectively reduced.

The embodiments of the invention are explained above in detail in conjunction with the accompanying drawings, but the invention is not limited to the above embodiments. Different variations can be made within the knowledge scope of those ordinarily skilled in the art without departing from the principle of the invention.

What is claimed is:

1. An apparatus for bonding and combining a pocket spring bed mesh, comprising:

a rack;

a platform arranged on the rack and used for driving the pocket spring bed mesh to move reciprocally;

a rotator arranged on the rack, located above the platform, and used for driving the pocket spring bed mesh to rotate; and a combiner arranged on the rack, located on a side of the platform, and used for combining pocket spring strings to form the pocket spring bed mesh;

wherein the combiner comprises:

a pressor arranged above the platform and able to move upwards and downwards, a preset gap being formed between the pressor and the platform;

a deliverer arranged outside the platform and used for delivering the pocket spring strings;

a transferor arranged outside the platform and used for transferring the pocket spring strings in the deliverer into the preset gap; and a glue sprayer used for spraying glue onto a side surface of the pocket spring bed mesh and/or each said pocket spring string.

2. The apparatus according to claim 1, wherein the rotator comprises a rotating frame and clamping plates arranged on two sides of the rotating frame respectively, and the clamping plates on the two sides are able to move close to or away from each other to clamp or release the pocket spring bed mesh; and the rotating frame is able to move upwards and downwards.

3. The apparatus according to claim 2, wherein a driver for driving the clamping plates to move upwards and downwards and/or to turn is arranged on the rotating frame.

4. The apparatus according to claim 1, wherein the pressor comprises a beam and a pressing plate and/or a conveying belt arranged below the beam and capable of moving upwards and downwards with respect to the beam; and a through hole penetrates through the pressing plate and/or the conveying belt.

5. The apparatus according to claim 4, wherein an air supplier is arranged on the pressing plate and/or the conveying belt.

6. The apparatus according to claim 4, wherein lifters, respectively connected to two ends of the beam, are arranged on the rack.

7. The apparatus according to claim 1, wherein the pressor comprises a pressing plate and/or a conveying belt, and an air supplier is arranged on the pressing plate and/or the conveying belt.

8. The apparatus according to claim 1, wherein the deliverer comprises a first conveying belt and a second conveying belt vertically spaced apart from each other.

9. The apparatus according to claim 1, wherein the transferor comprises a push rod capable of moving reciprocally to penetrate through the deliverer.

10. The apparatus according to claim 1, wherein the glue sprayer is arranged between the deliverer and the platform and is able to move reciprocally along a direction of conveying one of the pocket spring strings by the deliverer.

11. The apparatus according to claim 1, wherein the glue sprayer is fixedly arranged between the deliverer and the platform and faces the deliverer.

12. The apparatus according to claim 1, further comprising a switcher arranged at upstream position of the deliverer, the switcher comprising:

at least two conveying passages for accommodating pocket spring strings of different specifications;

a conveyor for conveying the pocket spring strings in the conveying passages into the transferor; and a cutter for cutting the pocket spring strings to a preset length.

13. The apparatus according to claim 1, wherein positioning plates are arranged on two sides of the platform respectively, and the positioning plates on the two sides are located between the rotator and the combiner and are able to move close to or away from each other to clamp or release the pocket spring bed mesh.

14. The apparatus according to claim 1, further comprising a sensor for detecting a length and/or width of the pocket spring bed mesh and/or a position of the pocket spring bed mesh.

15. The apparatus according to claim 1, wherein the platform comprises multiple rollers arranged in sequence.

16. The apparatus according to claim 1, wherein the platform comprises at least one section of conveying belt, and the adjacent conveying belts are arranged in sequence.

17. A method for bonding and combining a pocket spring bed mesh by an apparatus, the method comprising:

providing the apparatus comprising;

a rack;

a platform arranged on the rack and used for driving the pocket spring bed mesh to move reciprocally;

a rotator arranged on the rack, located above the platform, and used for driving the pocket spring bed mesh to rotate; and a combiner arranged on the rack, located on a side of the platform, and used for combining pocket spring strings to form the pocket spring bed mesh;

wherein the combiner comprises:

a pressor arranged above the platform and able to move upwards and downwards, a preset gap being formed between the pressor and the platform;

a deliverer arranged outside the platform and used for delivering the pocket spring strings;

a transferor arranged outside the platform and used for transferring the pocket spring strings in the deliverer into the preset gap; and a glue sprayer used for spraying glue onto a side surface of the pocket spring bed mesh and/or each said pocket spring string the method further comprising:

S1: forming a middle part of a pocket spring bed mesh by bonding and combination by using the combiner;

S2: moving the pocket spring bed mesh to the rotator by the platform, rotating the pocket spring bed mesh by a preset angle by the rotator, and then moving the pocket spring bed mesh to the combiner by the platform;

S3: bonding and combining outer parts of the pocket spring bed mesh by the combiner; and S4: repeating Step S2 and Step S3 at least once.

* * * * *